United States Patent [19]

Hunt et al.

[11] 4,323,007

[45] Apr. 6, 1982

[54] METHOD OF EXTRACTION OF JUICE FROM FRUIT

[76] Inventors: Arthur J. Hunt; Arthur J. Hunt, Jr., both of 332 N. Halifax Dr., Ormond Beach, Fla. 32704

[21] Appl. No.: 237,378

[22] Filed: Feb. 23, 1981

Related U.S. Application Data

[62] Division of Ser. No. 69,174, Aug. 23, 1979, abandoned.

[51] Int. Cl.³ .............................................. B30B 9/16
[52] U.S. Cl. ...................................... 100/37; 100/72; 100/117; 100/193
[58] Field of Search .................... 100/37, 72, 71, 73, 100/74, 75, 117, 193

[56] References Cited

U.S. PATENT DOCUMENTS

| | | | |
|---|---|---|---|
| 1,775,830 | 9/1930 | Reynolds | 100/72 X |
| 2,340,009 | 1/1944 | Meakin | 100/43 |
| 2,942,985 | 6/1960 | Stewart | 100/72 X |
| 3,037,445 | 6/1962 | Burner | 100/72 |
| 3,083,634 | 4/1963 | Rietz | 100/72 X |
| 3,085,502 | 4/1963 | Hurtig | 100/43 |
| 3,144,818 | 8/1964 | Sullivan | 100/117 X |
| 3,256,807 | 6/1966 | Hunt | 100/117 X |
| 3,355,260 | 11/1967 | Bruniche-Olsen | 100/37 X |
| 4,117,776 | 10/1978 | Hunt | 100/147 X |

FOREIGN PATENT DOCUMENTS

| | | | |
|---|---|---|---|
| 2515833 | 11/1975 | Fed. Rep. of Germany | 100/147 |
| 579146 | 7/1946 | United Kingdom | 100/128 |
| 1212251 | 11/1970 | United Kingdom | 100/127 |
| 272248 | 6/1971 | U.S.S.R. | 100/127 |

*Primary Examiner*—Billy J. Wilhite
*Attorney, Agent, or Firm*—Duckworth, Allen, Dyer & Pettis

[57] ABSTRACT

A method of extracting clear juice from apples and similar fruit involving the use of a screw press having a feed screw with a very gradual continuous slope of the body of the feed screw such that the fruit is gently compressed as it passes through the screw press. The fruit is introduced into the input of a first of such presses and the juices and solids expressed from such gradual compressing are filtered and the juice separated from the remaining solids which are then reintroduced into the input for additional compressing. A second press of the same type may receive the pressed fruit pulp from the output of the first screw press and additional juice extracted therefrom.

3 Claims, 8 Drawing Figures

METHOD OF EXTRACTION OF JUICE FROM FRUIT

This is a division of application Ser. No. 069,174 filed Aug. 23, 1979 now abandoned.

BACKGROUND OF THE INVENTION

1. Field of the Invention

The present invention relates to method of extraction of juice from fruits or vegetables, and more particularly to the use of a screw press having a gradual and continuous slope of the body of the feed screw for such extraction.

2. Description of the Prior Art

Screw presses have been widely used for the extraction of liquids from solids or semi-solids in the food industry. A primary application of such presses is the grape and wine industry. It is common practice to introduce harvested grapes into a destemmer or precrusher which serves to free the grapes from their stems. The destemmer in operation causes rupture damage to a large proportion of the incoming fruit which results in a free run of juice in the mass of grapes, or must, as the mass is termed. Before pressing the must to remove the remainder of the juice from the grapes, the must is predrained of this free running juice. Several methods are in common use. For example, the must containing the free run juice is transferred from the destemmer to settling tanks, where the free run juice is allowed to settle out. A typical settling time may be on the order of two hours. After settling, the free juice is drawn off and carried to a separator to remove solids which have collected from the crushing or destemming operation. The remaining must is dumped into feed troughs for transport to the final pressing operation. A typical time for the dumping and feeding operation may be on the order of one-half hour. The must delivered to the final press still contains free run juice since the settling tank cannot completely drain the original must in the alloted time. The extreme wetness of the must often causes difficulty in the conveyors and other predrainers which may be utilized prior to the final pressing.

Other systems utilize drag screens disposed along the conveyors from the destemmer to the presses which allow the free run juice to drain off and be collected in drain pans beneath the conveyors. This approach is also slow since the transport time must be long to provide sufficient draining time. Even with predraining, the wet must delivered to the presses causes difficulty in feeding due to slippage of the wet mass of grapes. This problem varies with the type of grapes being handled.

In the wine industry, great effort is expended to get a crop harvested at the proper time, with pickers working night and day until harvesting is complete. However, when trucks carrying the harvested crop arrive at the winery, it is common to have long waiting periods for unloading. This delay is generally due to the long times required for predraining and conveying of the must after destemming. Thus, the throughput of the winery is essentially limited by this operation.

Attempts have been made in the past to reduce the predrain time and to deliver a much dryer must to the final press. For example, U.S. Pat. No. 4,117,776 to Hunt describes a screw press apparatus having a two-section press. The first section receives the must directly from the destemmer without requiring settling tanks, drag screens, or the like. The feed screw of the first section includes a segmented body having a straight section, a sharply tapered section and a final straight section. Must is introduced into the first flights of the feed screw and carried along to the tapered body, thereby reducing the volume of the must producing a squeezing action. Further draining is then accomplished in the final straight section. The feed screw operates within a conventional chamber or cage formed from filter screens such that the free run juice squeezed from the must passes through the screens and is collected. The speed of rotation of the feed screw is adjustable in the order of 50 to 300 rpm. After the predraining operation, the resulting pulp is passed directly to the second section of the apparatus which operates as a conventional screw press compressing the predrained must to a final dry cake. The screw feed for the second section of the apparatus is separately rotated and designed to rotate on the order of 10 to 50 rpm. Although an improvement over the prior art and useful for many applications, in predraining grapes and pressing grapes, a number of problems have been found. First, the extremely wet undrained must, when introduced into the inlet of the predrainer section of the apparatus, caused slippage between the mass of grapes and the spiraling feed screw. Next, the relatively acute taper of the feed screw body contributed further to the slippage and caused difficulty in controlling the percentages of juices obtained in the predraining phase. Difficulty has also been encountered in attempting to independently adjust the rotational speeds of the feed screw in the predrainer section and in the press section to obtain optimum throughput. Another difficulty in the predrainer section involves the cleaning of the filter screens which requires excessive time and labor. In accordance with the present invention, the difficulties encountered in the predrainer of the previous Hunt patent have been solved, and a screw press provided which operates as a high speed predrainer for grapes and the like.

In addition to the wine and grape industry, many products require dewatering at certain stages in processing. Examples are: sugar beets; kelp; vegetables; spent grains; citrus pulps; pineapple peels; industrial sludges; animal stomachs; alfalfa; plastics; and cranberries. Many of these are wastes from food processing and the like to be completely dried and utilized for animal feeds. Such drying commonly requires high BTU burners which use large amounts of energy. Efficient screw presses, in accordance with the present invention, can predrain or remove a large percentage of liquids from such products quickly and at low cost. Thus, the energy requirements for final drying are greatly reduced.

Screw presses and other types of presses available in the prior art often use star wheels or breaker bars to mascerate grape skins and seeds, imparting a "grassy" taste to the juice or wine. When such presses are used with tobacco or paper sludges, these devices cause hard spots in the finished product called "fish eyes". Our invention advantageously dispenses with the need for star wheels or breaker bars.

SUMMARY OF THE INVENTION

The present invention is a screw press type-liquid extractor especially adapted to extraction of free run juice from grapes and similar fruit. In such application of our invention the press will be referred to as a predrainer. The press utilizes a feed screw having a body which increases in diameter over the full length of the screw in a linear fashion forming a gradual slope in conjunction with a drive system providing a high speed of rotation. The invention thus utilizes a gentle pressing action due to the gradual reduction in volume in the screw feed flights and a positive ejection of the liquids by virtue of centrifugal force generated from the high rotary speed of the feed screw. The feed screw is surrounded by filter screen cages through which the juice is ejected from the fruit. The juice is then collected in an appropriate drain system.

A key feature of the invention lies in the design of the inlet chamber. When used as a predrainer, the incoming must contains a large amount of free run juice and presents a wet, slippery mass to the feed screw. In prior art screw type presses, it is common to utilize a large inlet covering several flights of the feed screw and having tapering side portions such that a large volume of must can enter the inlet area in an attempt to maximize throughput. However, the result is that only the must closest to the cage portion of the press is positively fed into the pressing region. The must at the front end of the feed screw tends to slip and to thus limit the amount of must that can be fed. We have discovered experimentally that a maximum throughput in a screw press may be obtained by observing an optimum mathematical relationship between the pitch of the feed screw and the size of the inlet opening, and by limiting the open area around the front end of the feed screw. Accordingly, the invention utilizes an inlet having a longitudinal throat dimension of 1.5 times the pitch of the feed screw. We have also found for the predrainer application of the invention that the optimum ratio of the diameter of the feed screw to its pitch is 2 to 1. We have also found it advantageous to limit the opening of the inlet area of the sides encircling the front end of the feed screw to approximately 50% of the circumference. In other words, the first flight of the lead screw is enclosed by cylindrical sides for at least half of its circumference and preferably for about 75% of its circumference.

In operation with this novel inlet structure, a hopper is provided above the inlet and the free run liquid-containing must introduced into the hopper. To obtain the maximum throughput, that is, to insure that the must entering the first flight of the feed screw is transported forward and does not slip, requires a certain mass of must in the hopper. If less than this mass is present then slippage is possible, and if more mass is in the hopper, the density of the incoming must may be excessive. We have also found a relationship between the speed of rotation of the feed screw and the head formed by the must in the hopper for proper optimum feeding. For a given head, there is an optimum rpm required for the feed screw. Thus, we provide a variable speed drive unit for the feed screw such that the operator may maintain this optimum speed in accordance with the rate of incoming must to the hopper. On start-up of a predraining operation before the flow of must has begun, the operator may speed up the screw feed system to start the movement of must through the predrainer. Once this flow has begun the speed of the shaft can then be dropped to the normal operating rpm. Once the predrainer is filled and the hopper has reached its desired head, it may be noted that a pumping action occurs as the feed screw moves the must through the predrainer, in effect sucking the must into the inlet positively in addition to the normal tendency of gravity to feed the must.

As the must moves through the predrainer, the decreasing volume of space between successive flights of the feed screw combined with the gradual slope of the body causes a gentle pressing of the must to force the free run juice toward the outside of the mass aided by the centrifugal force generated by the relatively high speed rotation of the feed screw which may vary from 60 to 360 rpm. The free juice thus extracted flows through the surrounding screens and is drained into juice collecting pans disposed below the cage. As the must arrives at the end of the feed screw, it is ejected into a must collector for subsequent pressing to recover the remaining juice. In predraining grapes, it is common to obtain approximately 80% of the available juice in the apparatus of our invention.

The operator may determine the optimum operating conditions for particular varieties of grapes and other fruits utilizing the two variables of the head of the must in the hopper and the rotational speed of the feed screw. The higher the feed screw rotation, the more rapidly the must will be transported through the predrainer and the greater the amount of the juice that will be removed by centrifugal force. However, the faster the feed, the lower the head will be maintained in the hopper and the less efficient the feeding action will be. Thus, the operator must balance the rotational speed against the requirement for a certain head of must in the hopper and the proportion of juice removed. Once these parameters are determined experimentally and set for a given incoming must rate, the predrainer can operate with a minimum of attention. If the rate of incoming must drops, then the operator can reduce the rate of rotation of the feed screw sufficient to maintain the predetermined head, while an increase in incoming must will permit a higher rotational speed.

It is desired in wine making and other liquid extraction systems to minimize the amount of solids in the juices. In wine making, the destemming operation generally introduces a significant amount of solids which appear in the free run juice. It is therefore important that the predrainer and pressing operations do not add appreciably to these solids to minimize time and expense in separating the juice from the solids. The gentle squeezing and centrifugal force action in the predrainer of the invention advantageously prevents significant amounts of additional solids from occuring. The screen mesh may also be selected to provide some filtering action with respect to solids; however, a tendency of solids to clog the screens must be avoided. It is also important after a run to be able to easily and efficiently clean the filter screens. Additionally, it is desireable to be able to change filter screens for the optimum filter mesh design for the variety of grape or the type of fruit being processed. In prior art machines, disassembly of the screens has been necessary to accomplish such changes. In accordance with our invention, we have provided a hinging structure in which screens can be very easily and quickly cleaned and the predrainer made ready for the next run. Similarly, the hinging method permits easy interchange of screens when desired.

The filter screens of the invention comprise a pair of semi-circular sections of a cylindrical cage having a screen frame consisting of a plurality of circumferential ribs arranged to support the screens. The screen frames thus represent halves of a cylinder with attachment strips along the outer edges. A pivot shaft is disposed parallel with the drive shaft of the feed screw having a series of hinge blocks pivoted thereto. One edge of each screen frame is attached to a set of interleaved hinge blocks. The screen cage is split lengthwise forming two semi-cylindrical sections. The two sections are hinged at the bottom with the hinge blocks forming offset hinges such that opening of the two screen cage sections causes the sections to move downward and outward completely clear of the feed screw. The screen halves are normally secured at the top when the unit is in operation. When cleaning is required, the bolts holding the top edges of the screen sections together are removed and the two halves opened. At this point the inner surfaces of the screens are readily accessible for rinsing, scrubbing and cleaning, as is the feed screw. The screens are attached to the screen frames by attachment strips fastened to the frame edges. With the screens in the open position, the screens are readily removable and replaceable.

The preferred drive system for the invention utilizes a hydraulic system powered from an electric motor. The drive motor for the feed screw is therefore a hydraulic unit with control of the hydraulic pressure utilized to provide speed control. Thus, the electric motor serves only to operate the hydraulic pump to provide hydraulic pressure. Advantageously, the hydraulic motor transfers this energy at constant torque regardless of the speed.

It is therefore a principal object of the invention to provide a screw type press particularly suitable for use as a predrainer in removing free run juice from grapes and the like.

It is another object of the invention to provide a screw type press having a feed screw with a continuously sloped body in which a continuous gentle pressing action of the fruit is obtained.

It is yet another object of the invention to provide a screw type press especially suitable for extracting free run juice by gentle pressing action combined with centrifugal force.

It is still another object of the invention to provide a screw type press having an inlet opening matched to the pitch of the free screw to thereby eliminate slipping of wet must and to provide positive feed of such must through the press.

It is still another object of the invention to provide a screw type press having the above features in which the speed of rotation of the feed screw is adjustable to permit maintaining a preselected head of must in a hopper above the inlet.

It is a further object of the invention to provide a screw type press especially suitable for use as a predrainer in extracting juice from grapes and the like in which the speed of rotation of the feed screw is adjustable to provide optimum throughput to thereby remove a desired percentage of the juices contained in the must by centrifugal force and by gentle pressing for various rates of feed of must to the predrainer.

It is yet a further object of the invention to provide a screw type press having filter cages hinged for complete opening thereof for cleaning and interchange of screens without dismantling of the cages.

It is still a further object of the invention to provide a screw type press having a hydraulic drive system which will transfer energy at constant torque for various rotational speeds.

These and other objects and advantages of the invention may be determined from the detailed description below when read in conjunction with the attached drawings.

DETAILED DESCRIPTION OF THE PREFERRED EMBODIMENT

Figure 1:
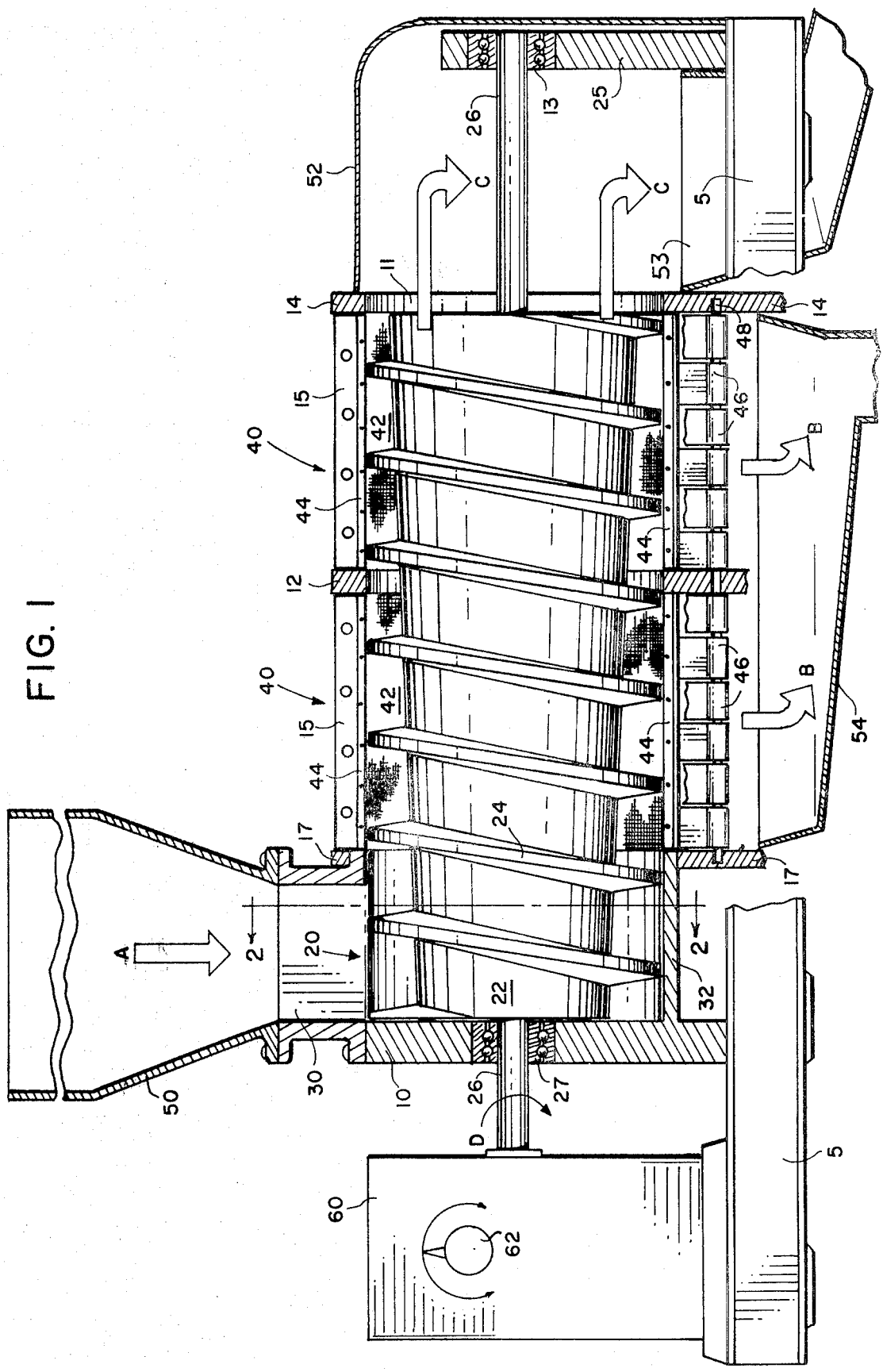
FIG. 1 is a cross-sectional view of the frame of the invention showing the feed screw.

Referring first to FIG. 1, a longitudinal cross-section of the preferred embodiment of the screw press is shown. The framework of the screw press consists of four transverse bulkheads mounted on a bed or base 5: front bulkhead 10 having a front bearing 27 mounted therethrough for shaft 26; rear bulkhead 14 having opening 11 therein; inlet bulkhead 17 utilized to support inlet housing 32 between front bulkhead 10 and inlet bulkhead 17; and intermediate bulkhead 12 provided between inlet bulkhead 17 and rear bulkhead 14 serving to divide a cage section shown generally at 40 into a front and rear section. Cage section 40 is formed by screen frames 41 (see FIG. 4) consisting of a series of circumferential ribs 49 supporting stainless steel screens 42 which form the inner walls of cage 40. Details of the cage construction are discussed below. Thus, the essentially cylindrical inlet housing 32 and cage section 40 form an elongated cylinder housing a feed and compressing screw shown generally at 20. Screw 20 consists of a base or body portion 22 mounted to and concentric with drive shaft 26 as may be noted in FIG. 2. Drive shaft 26 is supported at its rear end by bearing 13 in pillow block 25. Body portion 22 has a small diameter at its front end and a large diameter at its rear end with its surface forming a frusto-conical shape having a continuous slope. Spiral screw threads 24 are affixed to the surface of body portion 22 and have a constant diameter with sufficient clearance to turn within the walls of the cage 40 and inlet housing 32 without interference therewith. As may be noted from FIG. 1, the volume or space between body portion 22, screen walls 42 and the faces of threads 24 diminishes from the front end of the press to the rear end. The degree of slope of body portion 22, the pitch and diameter of spiral threads 24 and the length of the press are all parameters which may be selected in accordance with the material to be pressed, the characteristics of the liquids to be expressed, the volumes of material to be handled, and the throughput required. However, we have determined experimentally, for use with grapes, that the optimum ratio of the length of the feed screw to the diameter of the screw threads is about 4 to 1. When a smaller ratio (shorter press) is used the slope of the screw body 22 is greater and the materials tend to pack and require excessive driving power. If the ratio is larger, the throughput is reduced without an increase in extracted liquids.

As shaft 26 is rotated in the direction shown by the arrow D, material in the spaces between threads 24 will tend to be moved longitudinally along the press and ejected at the rear end as shown by solid arrow C. Assuming that the flights between threads 24 are essentially filled with material, it may be noted that the material will be gradually reduced in volume due to the taper of body portion 22. Therefore, liquid contained in the material will be squeezed out and will pass through screens 42 between ribs 49. Such liquids will be collected by pan 54 in the base 5 and may be withdrawn via and outlet as shown by solid arrow B. As may be seen in FIG. 4, stainless steel covers 56 are used over bulkheads 17, 12 and 14 extending down and connecting to base 5 to prevent loss of liquids and to direct such liquids into pan 54. As the liquid is removed from the material, the remainder is carried through the opening in rear bulkhead 14 into collector 53 for collection and further processing as indicated by solid arrows C. Feed and compression screw 20 is driven via shaft 26 from a hydraulic drive unit 60 which includes a manually variable speed control indicated at 62. While the rotational speed of feed screw 20 is a design parameter and may be selected in accordance with the materials to be pressed and the desired throughput, we prefer to utilize a range of 60 to 360 rpm which is eminently suitable for extracting juice from grapes.

Figure 2:
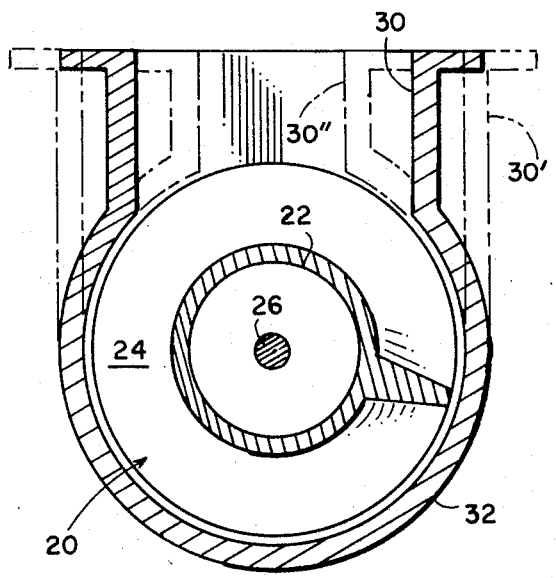
FIG. 2 is a cross-sectional view through the plane 2—2 of FIG. 1 showing a preferred inlet section of the screw press of the invention and showing a minimum and maximum throat opening.
Figure 3:
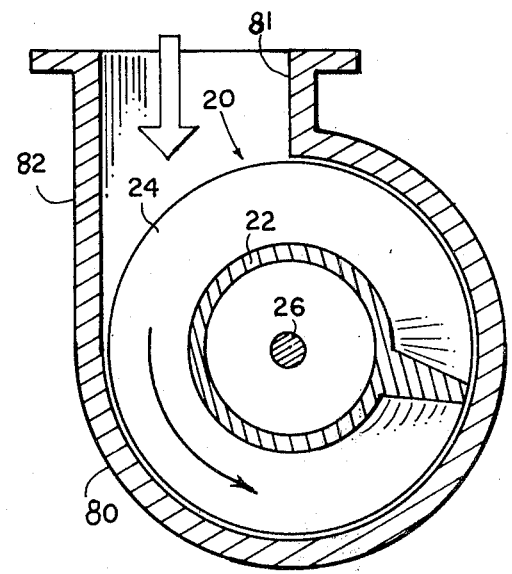
FIG. 3 is a cross-sectional view of an inlet section of the invention utilizing an offset throat.

When utilizing the press of the invention with grapes or similar fruits which tend to be slippery when wet, problems are encountered in prior art screw presses in obtaining positive feeds. The wet mass of such fruit tends to slip at the inlet portion of the press with a resulting reduction in throughput. To overcome this problem we have determined optimum parameters of inlet section 32 and inlet throat 30. In accordance with our invention, the longitudinal length of the opening of inlet throat 30 is limited to not more than 1.5 times the pitch of spiral screw threads 24. Referring to FIG. 2, it is also necessary that inlet housing 32 enclose the lower portion of threads 24 to at least half of their circumference as indicated at 30' representing an opening. For very wet materials, the opening may be narrowed to enclose 85 to 90% of the circumference as indicated by inlet 30". For most applications, however, we prefer about 75% of the circumference enclosed as shown at 30. As the fruit, such as grape must, is fed into hopper 50 the must will enter through inlet throat 30 and flow into the totally enclosed region of inlet housing 32. As feed screw 20 rotates, any tendency of the must to slip rather than to be carried by the threads 24 and body 22 is essentially prevented. As a portion of the must is carried into the completely enclosed circumference beyond the throat 30, a pumping or suction effect results operative on the following must and a continuous flow of must along the press results, assuming that the must in hopper 50 is maintained at an appropriate level. In some instances where a large amount of free run juice may be present in the must, the operator may run shaft 26 at a higher than normal speed to assist in start of the feed, however, as soon as positive feed begins, the pumping and suction effect is self sustaining in accordance with the invention. An alternative throat design that we have found very effective offsets the inlet in the direction of rotation of the feed screw. FIG. 3 shows inlet 81 having a side 82 tangent with inlet housing 80. Thus, material input as indicated by the solid arrow is carried by gravity in the direction of rotation of feed screw 20 as shown by the rotational arrow, assisting in starting and maintaining positive feedings.

Having hereinabove explained the basic functional elements of the screw press of our invention, a typical application will now be described. As previously mentioned, in the wine industry free run juice or liquid generated during destemming operations is required to be removed from the must before final pressing. The invention is admirably suited to perform this predraining operation quickly and efficiently at high throughputs. For example, in a predrainer, in accordance with the invention, having a screw diameter of 2 feet and a feed screw length of 8 feet, 75 to 150 tons per hour of grapes can be predrained to approximately 80% of the total available juice as compared to prior art systems using settling tanks and the like in which predraining of must from destemmers operating at 50 tons per hour is predrained typically at a rate of $7\frac{1}{2}$ to $8\frac{1}{2}$ tons per hour.

The destemmed and precrushed grapes directly from the destemmer are fed into hopper 50 as shown by solid arrow A (FIG. 1). The must enters inlet housing 32 via throat 30 as previously described and the operator sets the desired feed and compression screw speed by control 62. This speed is predetermined for particular varieties of grapes such that the ejected must at C has been pressed to remove about 80% of the available juice. The required speed of rotation is also affected by the must head in hopper 50. If insufficient head is present, difficulty is encountered in maintaining positive feed at high rotational speeds. Therefore, it is desirable to have a flow rate from the destemmer sufficient to maintain an optimum head. With a higher velocity of feed screw 20, the centrifugal force on the must being squeezed is greater and more juice will be ejected for a given distance traversed through the press by the must. An increase in rotational velocity will thus cause increased throughput without sacrificing the percentage of liquid removed as long as the head in hopper 50 is not excessively reduced. If the velocity is too high such that the head is lost, only partial feeding occurs, and the flights are not completely filled. Thus, the must will travel rapidly through the press, will be only partially pressed, and will be ejected with excessive juice remaining. As may now be seen, the operator can readily maintain the predrainer at its optimum throughput by observing the head in hopper 50 and adjusting speed control 62 to compensate for variations in the head.

Figure 4:
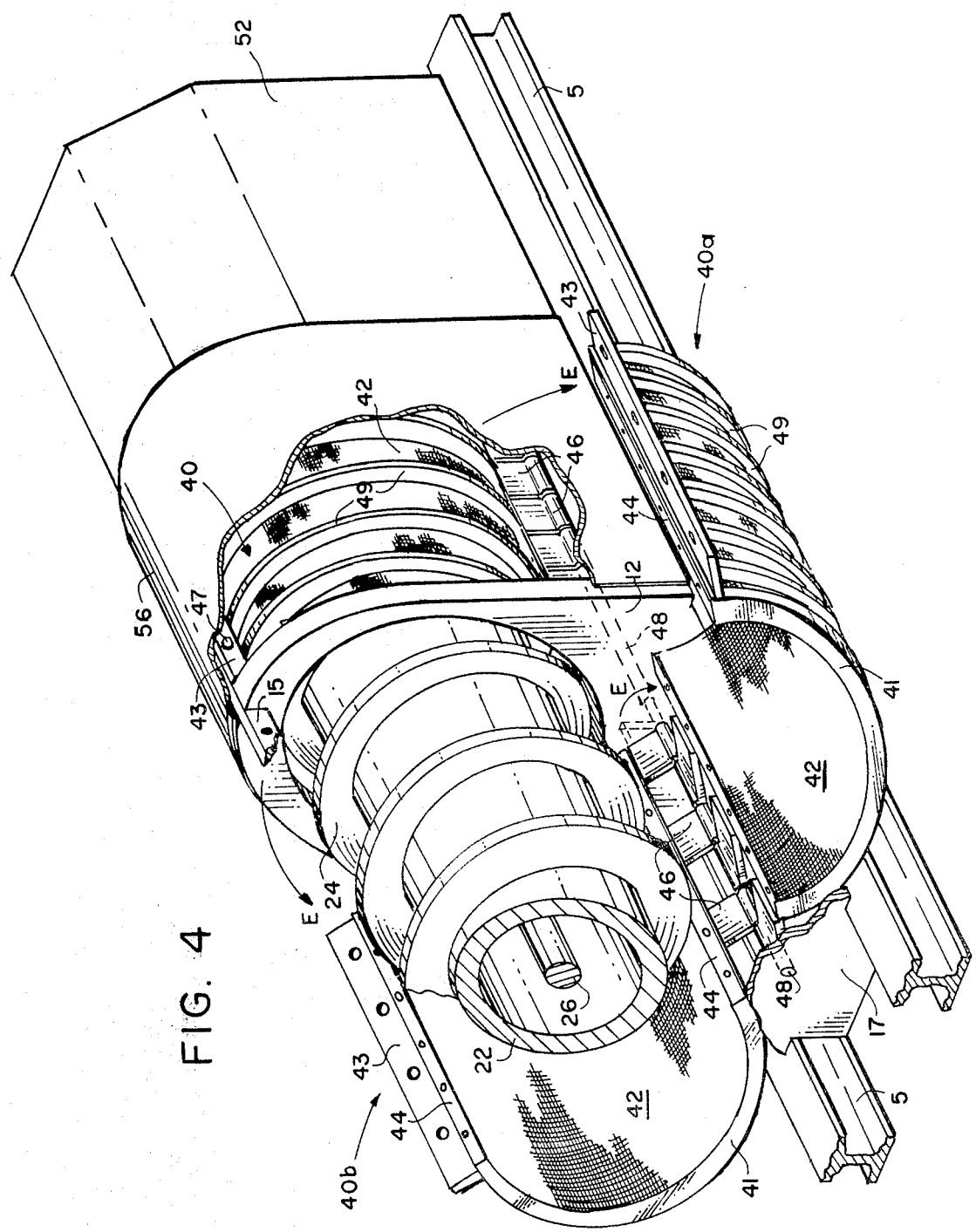
FIG. 4 is a partial perspective view of the screw press showing the filter screen cage in its normal operating position via a cutaway view and another cage section in its open position for cleaning or changing of screens.

Turning now to FIG. 4 certain aspects of our invention will be described which greatly simplify day to day maintenance of the press, and provide flexibility of applications. FIG. 4 is a partial perspective view of the press of the invention with certain parts omitted and others cut away for clarity. The improvements disclosed are in reference to screen cage 40. The rear section of the press between intermediate bulkhead 12 and rear bulkhead 14 is shown in operating condition with stainless steel cover 56 partially cut away to reveal the exterior of cage 40. The forward cage section 40 is shown with cover 56 removed and cage 40a, 40b opened for cleaning or screen replacement. As may be noted, cage 40 comprises two semi-cylindrical sections thereof hinged at their lower edges. When in the closed or operating condition as noted with respect to the rear section, the two halves are joined to screen frame mounting bar 15 through mounting strips 43 with bolts 47. To open the screen cage, bolts 47 are removed and the screen sections opened in a book-like fashion. In order to completely clear feed screw 20, the hinges are formed by hinge extension blocks 46 and pivot shaft 48. As may be noted hinge extension blocks 46 extend the pivot line a short distance below the cage 40 so that the cage halves 40a and 40b move downward and outward when opened as shown by arrows E. This design advantageously completely exposes the inner wall surfaces of screens 42 to allow rinsing, scrubbing, and otherwise cleaning of the mesh. If the press is to be next used with a different material or a different variety of fruit requiring a different mesh size or type, screens 42 may be easily changed by removing the screws holding screen attachment strips 44 to frame 41. New screens with the required mesh design may then be readily re-installed. While a variety of screen materials may be used dependent upon the material to be pressed, we prefer material known as KLEENSLOT screen manufactured by WEDGE-WIRE Corporation which is available in a wide variety of meshes and designs. We have found that the use of slotted screens greatly minimizes clogging as compared to perforated screens. The novel cage design also permits ease of cleaning of feed screw 20 since all areas of the feed screw are readily accessible when the cages 40 are in their open position. Thus, very little down time is required for the press of the invention for cleaning of the screens and feed screw prior to another run.

Figure 5:
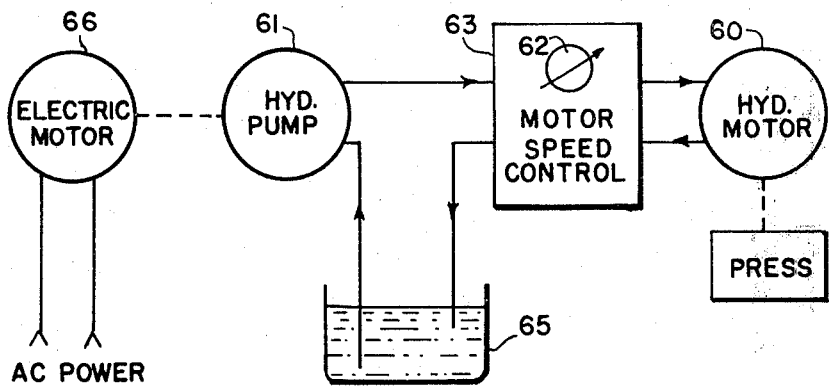
FIG. 5 is a greatly simplified schematic diagram of the drive system of the screw press.

As previously described, we prefer to use a hydraulic drive unit for powering the press. FIG. 5 shows generally a greatly simplified block diagram of the drive system. Basically electric motor 66 is utilized to drive hydraulic pump 61 with reservoir 65 providing hydraulic fluid. Hydraulic drive unit 60 includes a hydraulic motor with motor speed control 63 controlled by knob 62. The primary advantage of the hydraulic drive system is that constant torque is provided over the normal range of speed variation of the hydraulic motor.

ALTERNATIVE EMBODIMENT

The preferred embodiment of the invention described hereinabove contemplates the use of the press for predraining of grapes and the like and for extracting juice from other fruits and vegetables and the like. In such applications the squeezing of the material is due to the diminution of the volume between the screw feed and the screen cage walls. However, the invention may also be utilized for dewatering of materials with very low concentrations of solids such as sludges, sewage, and the like. An alternative embodiment of the invention will enable materials having from one-half to 6% or so of solids to be effectively dewatered.

Figure 7:
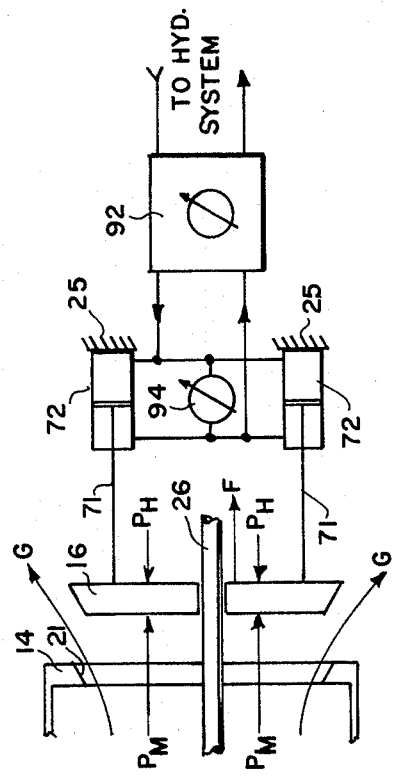
FIG. 7 is a simplified schematic diagram of the door pressure system of the alternative embodiment of the invention.
Figure 6:
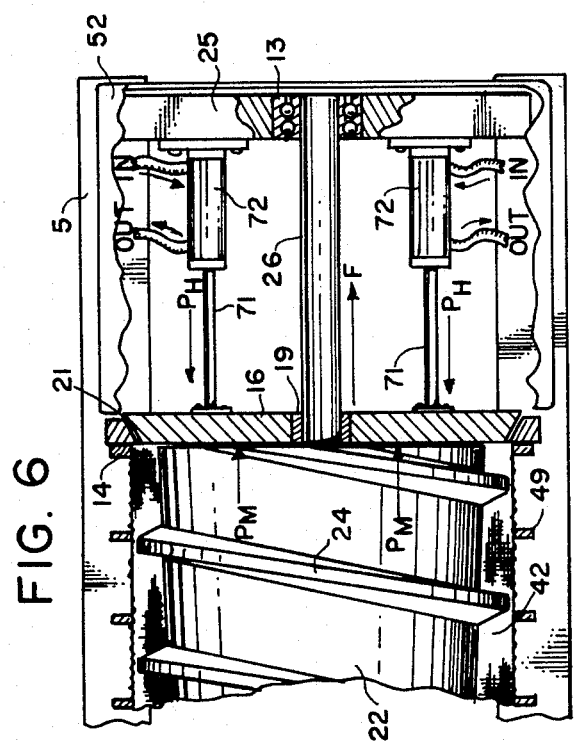
FIG. 6 is a cross-sectional top view of the output end of an alternative embodiment of the invention.

Turning now to FIG. 6, a cross-sectional view of the output end of an alternative embodiment of the invention is shown. It is to be understood that the forward portions of the screw press of this embodiment are in all respects identical to the press shown in FIG. 1 and subsequent figures. Rear bulkhead 14 is provided with a circular opening 21 which may be tapered as indicated in FIG. 6. A circular door 16 is slidably engaged with drive shaft 27, which can move along shaft 26 on bushing 19. Rear pillow block 25 which supports the outer end of shaft 26 also supports a pair of hydraulic actuators 72 having actuator rods 71. Actuator rods 71 are attached to the outer face of circular door 16 and the inlet lines of actuator 72 connected to a source of hydraulic pressure as indicated in the simplified schematic diagram of FIG. 7. Hydraulic pressure $P_h$ is applied to actuator 72 from the hydraulic system so as to force door 16 which has its outer edges tapered into the matching taper 21 in the opening in bulkhead 14. This pressure, as shown by arrow $P_h$, serves to hold door 16 closed when no material is present in the screw press. However, as material is input to the press of FIG. 6 such that the screw flights become filled with material, continued rotation of feed screw 20 will force the material in the last flight against the exposed outer rim portion of the inner face of door 16 producing pressure indicated by the arrow $P_m$. Thus, in addition to pressing or squeezing of the material due to the reduction in volume of the screw flights, the faces of the last screw flights will exert pressure on the material against the inner face of door 16, creating pressure $P_m$. This additional pressure, due to the force of the feed screw, will, of course, express additional moisture or liquid from the material through screens 42. The required hydraulic pressure $P_h$ is a system adjustment parameter dependent on the type of material being pressed. Referring to FIG. 7, it may be noted that hydraulic actuators 72 are supplied hydraulic pressure from the hydraulic system of FIG. 5 via pressure controller 92. Thus, the operator may, by adjusting pressure controller 92, set the pressure required for door 16 to open. A pressure relief or bypass valve 94 is disposed across the input and output lines of actuators 72 such that when the pressure $P_m$ on the inside face of door 16 exceeds the external pressure $P_h$ the door will be pushed rearward in the direction as indicated by arrow F and bypass 94 will relieve the back pressure in actuators 72. As door 16 opens the material will be extruded between the edges of door 16 and the opening 21 as indicated by flow arrow G in FIG. 7. This flow reduces pressure $P_m$ resulting in an opening such that $P_m$ and $P_h$ are balanced. As may be understood, the dryness of the pressed material exiting from the press is a function of the type of material, the speed of rotation of feed screw 20, the type of and areas of the mesh openings in screen 42, and the pressure $P_h$ exerted by the hydraulic actuators. The optimum parameters may be determined experimentally to produce maximum throughput for each of a variety of materials, and the press adjusted prior to operation for a given material.

SYSTEM APPLICATIONS OF THE INVENTION

As discussed above, the predrainer press in accordance with the invention may have the length, diameter, slope and pitch of the spiral threads varied in accordance with the type of material to be dewatered. Similarly, the filter screens may use a variety of mesh designs and degrees of fineness according to the solids to be held back. In the dewatering of many materials, it is not practical to select these parameters such that a total dewatering can be performed in one machine. In such cases, two or more predrainers of the invention may be used in tandem, with variations in the variable parameters from machine to machine such that the maximum liquid extraction may be obtained while maximizing throughput or production of the system. A system in accordance with the invention in tandem will be described here below. To illustrate such an application, the production of clear apple juice will be described.

It is generally agreed that the best method of producing clear apple juice is by the well-known rack and cloth method. In this method, the apples are spread in thin layers, for example two inches thick, with burlap fabric between layers. During pressing, the burlap acts as a filter to minimize solids in the juice. A flat, even pressure is then applied downward on the layers of apples, generally by a hydraulic type press. While producing excellent juice, the rack and cloth method is slow and a low volume process. Modern screw presses have been used to dejuice apples and, due to the consistency of the apple stock, it has been necessary to add bulking agents such as paper, wood, or rice hulls. However, most screw presses have too great a volume between the screw flights and do not produce enough pressure against the mass for a long enough period to sufficiently dejuice the apples.

Since the predrainer press of the invention produces a uniform pressure against the screens from the gentle rise in diameter of the screw body and the fact that the apples are in a relatively thin layer, the action closely resembles the rack and cloth method, eliminating the necessity for additives in the press. We have discovered that the long, gradual slope of the feed screw of the invention also reduces excessive back pressures and prevents excessive solids in the juice. For example, a feed screw having a four inch depth of the thread at the feed end, a ⅜ inch depth at the exit end, and a slope length of about 8 feet is ideal for dejuicing apples.

A much greater yield of clear apple juice may be obtained with the predrainer press of the invention by utilizing a system of predrainer presses operated in series in which the variable parameters of each successive press are selected to specifically match or adapt to the consistency and remaining liquid content of its input. We have determined that a three-stage system is well suited to clear apple juice production.

Figure 8:
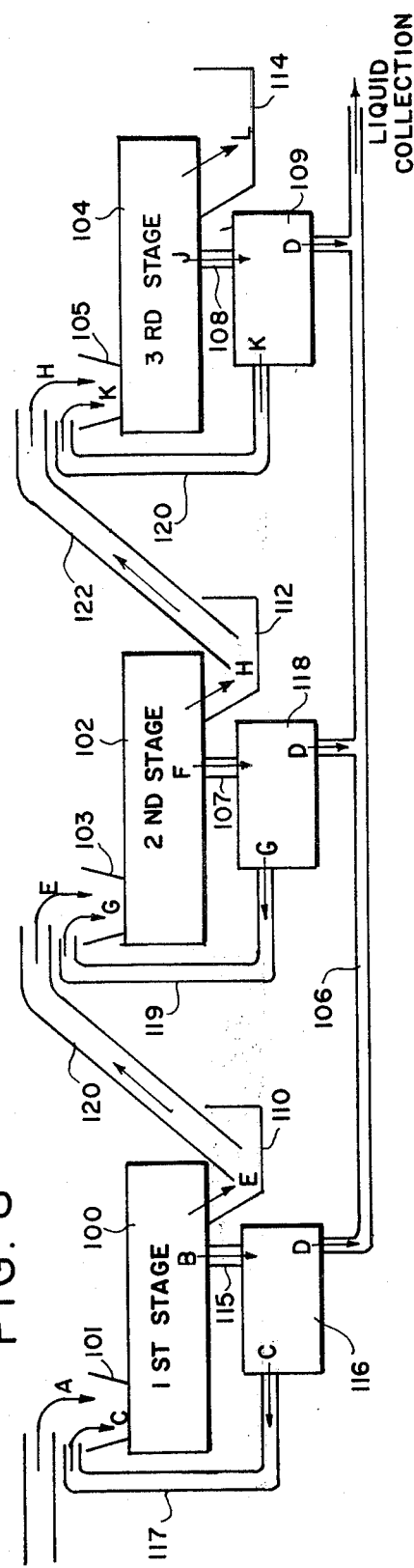
FIG. 8 is a functional block diagram of a tandem juice extraction system utilizing the invention.

Turning now to FIG. 8, a three stage system utilizing predrainer 100 as a first stage, predrainer 102 as a second stage and predrainer 104 as a third stage is illustrated. While we show here three stages, it may be understood that some types of fruit may require only two stages, others may effectively utilize additional stages. The parameters of each stage, such as feed screw pitch, feed screw slope, screen amplitude size and form, speed of rotation of the feed screw, and the optimum head in hoppers 101, 103 and 105 may be determined experimentally for the particular types of apples to be processed.

Also shown is a novel separator and recycling system which increases the yield of clear juice over known systems.

In operation the apples are introduced in the first stage in hopper 101 as shown by input arrow A. The apples are pressed through the operation of the predrainer 100 and, combined with the centrifugal force of the relatively high speeds of the feed screw of predrainer 100, produce expressed juice B from drain 115. The centrifugal force action minimizes the solids which may pass through the filter screens by permitting smaller screen apertures; however, the output of the juice is maximized by allowing some such solids to pass. Advantageously, a separator 116 is utilized to filter off clear juice D which appears in outlet pipe 106. The solids remaining are indicated by flow arrow C and are carried by conveyor 117 back to the input hopper 101 and recycled through first stage predrainer 100. The pulp E, which exits from the machine into output tray 110, is carried by conveyor 120 to hopper 103 of second stage predrainer 102 and is pressed for a second time therein. The output juice F from drain line 107 is directed to separator 118 which separates the clear juice D in line 106 and directs the separated solids G via conveyor 119 back to input hopper 103 to be recycled through predrainer 102. The drier pulp H after its second pressing is collected in output pan 112 at H and carried by conveyor 122 to hopper 105 of third stage predrainer 104. The operation is repeated in this stage with juice J at drain outlet 108 being separated in separator 109 with clear juice D joining the clear juice from the previous stages to the juice collection system. Again, separated solids K are reintroduced into hopper 105 by conveyor 120. Finally the completely dry pulp L is collected in tray 114 for disposal.

The high efficiency and rapid though gentle pressing of the apples in thin layers through the various stages of the system, and the recycling of the separated solids from the juice provides an apple dejuicing system having clear apple juice of the quality associated with the rack and cloth method but with production at a much higher rate. Although the system of FIG. 8 has been described with reference to apples, it is to be understood that many types of fruit and vegetables lend themselves to the described process with greatly reduced processing costs by the elimination of additives, the increase in throughputs, and increased volume of liquids produced.

As may now be recognized, we have disclosed a novel screw press for extracting liquids from liquid-containing materials which has a positive feed system, a continuously sloping feed screw that provides a gentle pressing operation, a variable speed drive permitting optimization of throughputs and easily cleanable and changeable filter screens. Although a specific preferred embodiment has been shown, various modifications and changes will be obvious to those of skill in the art. Therefore, the disclosed embodiments are to be considered for example only and we are not to be limited thereto. The invention has also been described in relation to specific materials but many other materials may be handled by the disclosed press.

We claim:
1. A method of extracting clear juice from apples or the like comprising the steps of:
   (a) introducing the fruit into the input of a first screw type press having a gradual continuous slope of the body of the feed screw;
   (b) gently compressing the fruit in the screw type press to express juice and solids from the fruit;
   (c) filtering the expressed juice and solids;
   (d) separating and collecting the clear juice from the expressed solids; and
   (e) reintroducing the separated expressed solids into the input of the screw type press.

2. The method as defined in claim 1 comprising the further steps of:
   (f) collecting the pressed fruit pulp from the output of said screw type press;
   (g) introducing the collected compressed pulp into a second screw type press; and
   (h) repeating steps (a) through (f) in the second screw type press.

3. The method of claim 2 comprising the further steps of combining the separated and collected clear juices from the first and second screw type presses.

* * * * *